(No Model.) 2 Sheets—Sheet 1.
P. YARRINGTON.
APPARATUS FOR MANUFACTURING HYDROGEN GAS.
No. 525,380. Patented Sept. 4, 1894.
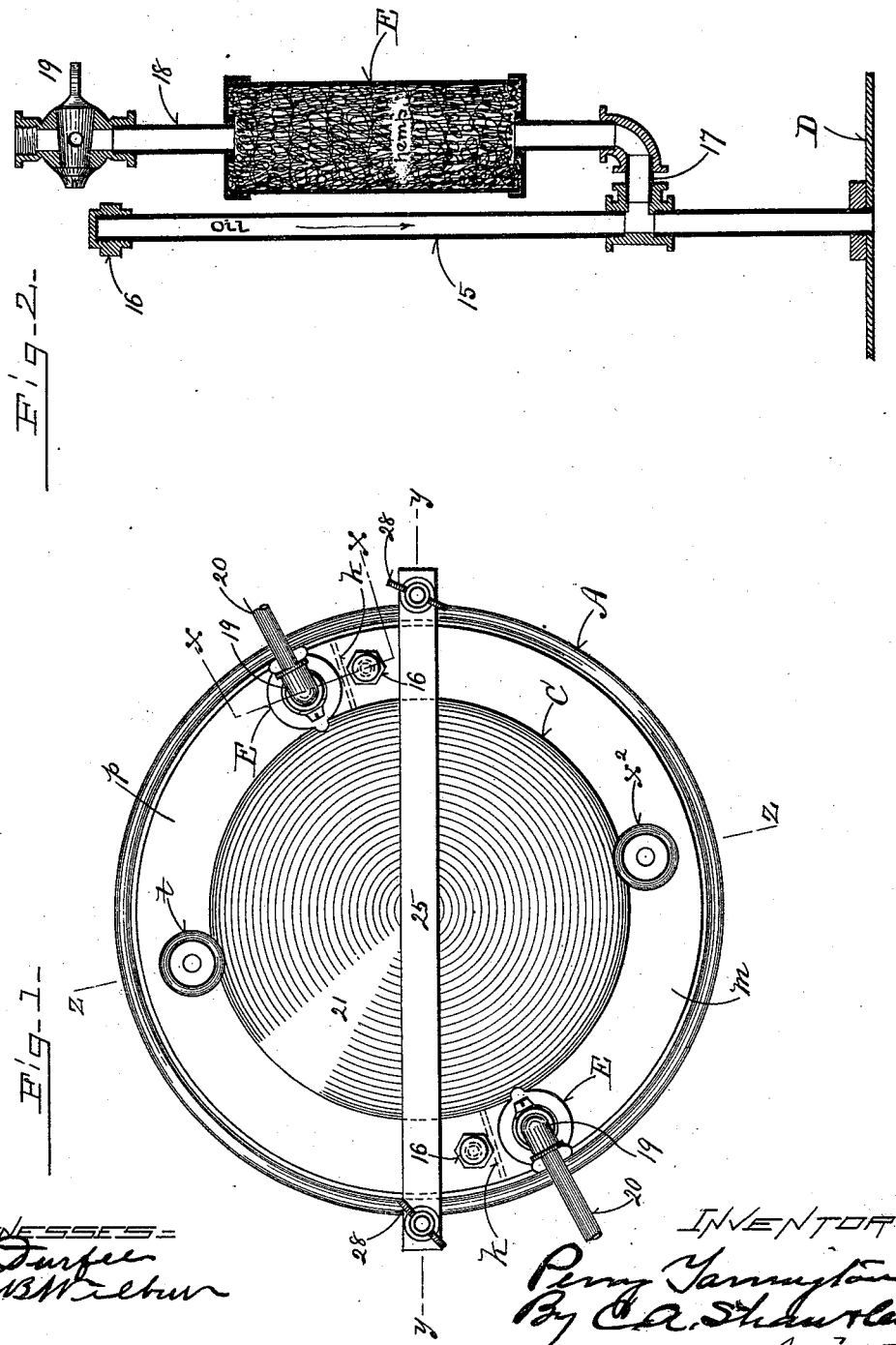

(No Model.) 2 Sheets—Sheet 2.
P. YARRINGTON.
APPARATUS FOR MANUFACTURING HYDROGEN GAS.
No. 525,380. Patented Sept. 4, 1894.
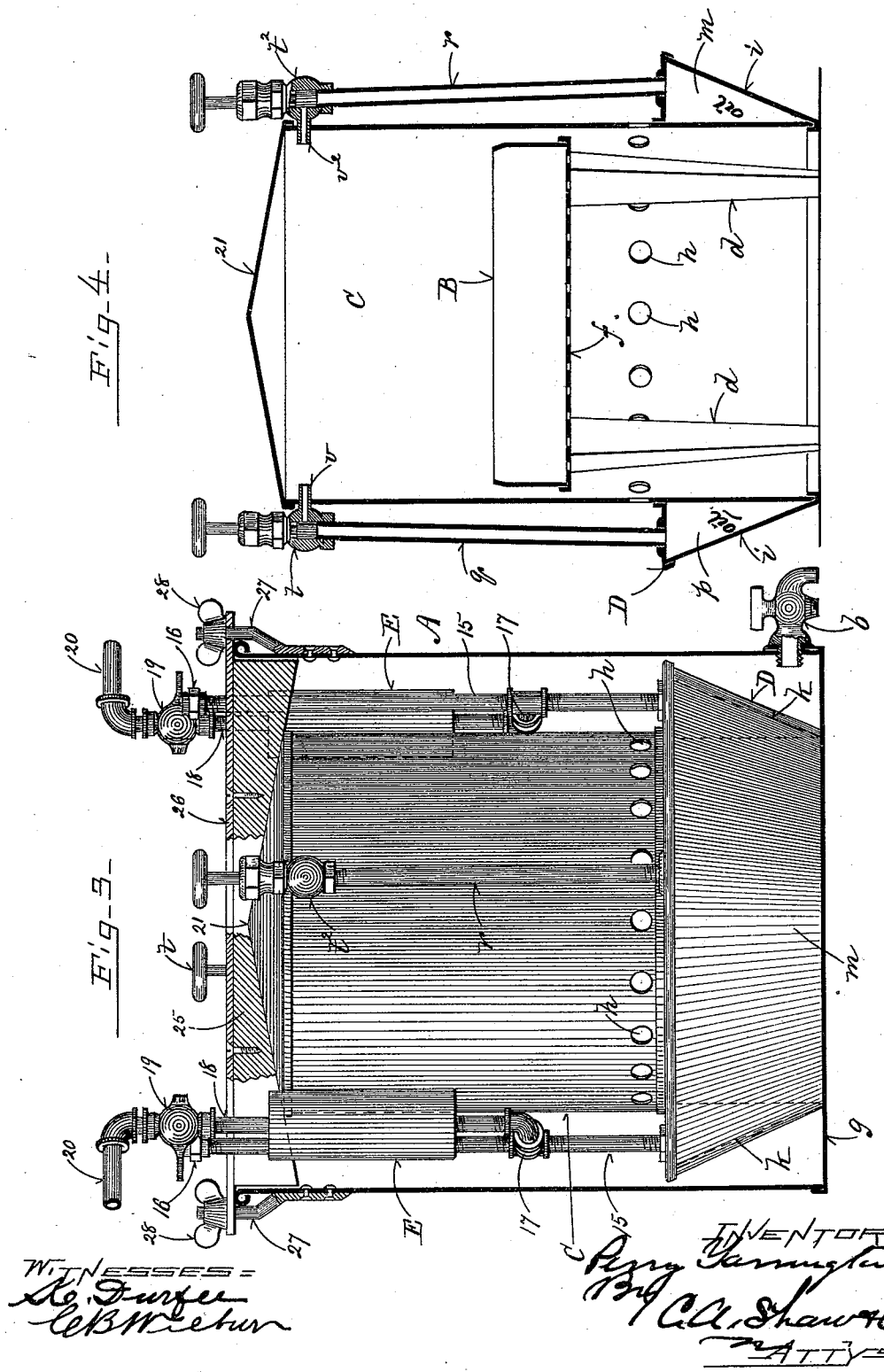

UNITED STATES PATENT OFFICE.

PERRY YARRINGTON, OF BOSTON, MASSACHUSETTS.

APPARATUS FOR MANUFACTURING HYDROGEN GAS.

SPECIFICATION forming part of Letters Patent No. 525,380, dated September 4, 1894.

Application filed January 5, 1894. Serial No. 495,852. (No model.)

*To all whom it may concern:*

Be it known that I, PERRY YARRINGTON, of Boston, in the county of Suffolk, State of Massachusetts, have invented certain new and useful Improvements in Apparatus for Manufacturing Hydrogen Gas, of which the following is a description sufficiently full, clear, and exact to enable any person skilled in the art or science to which said invention appertains to make and use the same, reference being had to the accompanying drawings, forming part of this specification, in which—

Figure 1 is a top plan view of my improved hydrogen gas generator; Fig. 2 a vertical section enlarged taken on line, $x$, $x$, in Fig. 1; Fig. 3 an elevation of the generator, a portion being shown in a vertical section taken on line, $y$, $y$, in Fig. 1; and Fig. 4 a sectional view of the retort taken on line, $z$, $z$, in Fig. 1.

Like letters and figures of reference indicate corresponding parts in the different figures of the drawings.

My invention relates especially to an apparatus for manufacturing hydrogen gas for illuminating or heating purposes, said apparatus being portable and combining mechanism whereby the pure hydrogen gas for heating or the carbonated gas may be generated in the tank.

The object of this invention is to produce a simple, cheap and effective device of this character which may be employed on railway cars and similar places.

In the drawings, A represents the metallic outer tank which is preferably cylindrical and is provided near its bottom with a faucet, $b$, for draining.

Resting upon legs, $d$, within the body and removable therefrom is a pan or tray, B, provided with a perforated bottom, $f$, (see Fig. 4) said tray being designed to contain zinc or other gas producing material.

A dome or gasometer, C, comprises a cylinder adapted to inclose the pan, B, and rest on the bottom, $g$, of the tank. This gasometer is provided with a series of openings, $h$, through which the acid contained in the tank may enter to attack the zinc in the tray.

Around the bottom of the gasometer there is an annular chamber, D, formed having a converging outer wall, $i$. This chamber is divided by vertical partitions, $k$, into two compartments, $m$, $p$. A vertical pipe, $q$, opens from the top of the compartment, $p$, and is closed at its upper end by a cock, $t$, from which a nipple, $v$, leads into the top of the gasometer. A similar pipe, $r$, opens from the compartment, $m$, and is closed by a cock, $t^2$, and a nipple, $v^2$, opens into the gasometer at its top. A filler pipe, 15, opens into each of the compartments, $m$, $p$, and has its top closed by a screw-cap, 16. The pipes, 15, are tapped a short distance from their lower ends by a branch and suitable couplings, 17. A packing chamber, E, is connected with each of the branches, 17, said packing comprising hemp, waste or other suitable material. Pipes, 18, lead from the top of the packing chambers and a coupling, 19, in which a stop cock is interposed connect said pipes, 18, with a branch, 20, which may lead to the burners or heating apparatus as desired. The top, 21, of the gasometer is convex.

In the use of my improvement, the pan, B, is disposed in the tank or body, A, and filled with zinc, marble dust, iron scraps or other gas-generating material. The bell or gasometer, C, is disposed over said pan and has one of its chambers, as $m$, filled with naphtha, gasoline or similar carbonaceous material through its filler pipe, 15. The tank is then filled with a weak solution of sulphuric acid and water which passes through the perforations, $h$, of the bell and acts upon the iron in the pan generating hydrogen and carbonic-acid gas which ascending in the bell will pass through either of the nipples, $v$, or $v^2$, into the corresponding compartments, $p$, or, $m$.

When illuminating gas is desired the cock, $t$, is closed and all the gas generated in the bell passes through the pipe, $r$, into the compartment, $m$, when it takes up the carbureting substance and receives its illuminating properties. As thus prepared it may be drawn off by opening the corresponding cock, 19, the gas passing through the packing chamber, E. This packing serves also as a means for preventing the excessive pressure within the dome from forcing the carbureting material from the compartment, $m$, through the pipes, 18 and 20, to the burner.

It will be understood that both the compartments, m, p, may be filled with carbureting material and illuminating gas be drawn simultaneously from both cocks, 19.

When the cock, t, is open and the cock, t², closed the compartment, p, being empty clear hydrogen gas may be taken therefrom and employed for heating purposes thus combining in one apparatus both the heating and illuminating gas as both cocks, t, may be simultaneously opened.

To hold the gas reservoir or dome, C, against the pressure of gas within it I employ a clamping-bar, 25, of wood cut to coincide with the convex top of the dome and having an iron facing, 26, which will extend over the rim of the tank, A, receiving screw lugs, 27, fast to said tank and on which thumb-screws, 28, are turned, any other means other than this may be employed. It will be seen, moreover, that the compartments, m, p, either of which may contain the carbureting material which is of a highly inflammable nature is at all times submerged in a fire extinguishing liquid adding greatly to the safety of the apparatus.

In the pan, B, I frequently employ the elements ordinarily used in a galvanic battery.

The tank, dome and pan are preferably constructed of copper. In the pan can be placed zinc and carbon plates.

The action of the sulphuric acid in the tank will generate an electric current. A current thus generated may be conducted by any of the well known means in addition to utilizing the gas for illuminating or heating purposes.

Having thus explained my invention, what I claim is—

1. The combination with the tank of the dome, C, disposed therein and provided with perforations, h; the compartments, m, p, on the lower portion of said dome and respectively connected therewith near the top by pipes, q, r; the perforated pan, B, for containing gas generating material disposed within said dome; the cover and locking mechanism for the tank; and a discharge pipe for each compartment outside the dome and opening through said cover, substantially as described.

2. The combination with the tank of the dome, C, disposed therein and provided with perforations, h; the compartments, m, p, on the lower portion of said dome and respectively connected therewith near the top by pipes, q, r; the perforated pan, B, for containing gas generating material disposed within said dome; a cover for the tank; a discharge pipe for each of said compartments opening through the tank and a filtering packing interposed in said discharge-pipes, substantially as described.

PERRY YARRINGTON.

Witnesses:
O. M. SHAW,
K. DURFEE.